Feb. 8, 1927.
R. BERINGER
1,616,648
WINDSHIELD CLEANER INSTALLATION
Filed Nov. 15, 1922
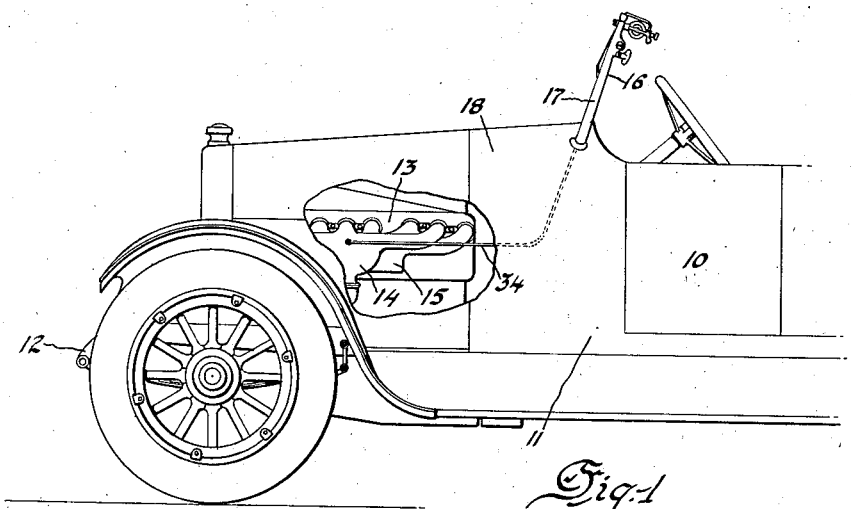
Fig.1
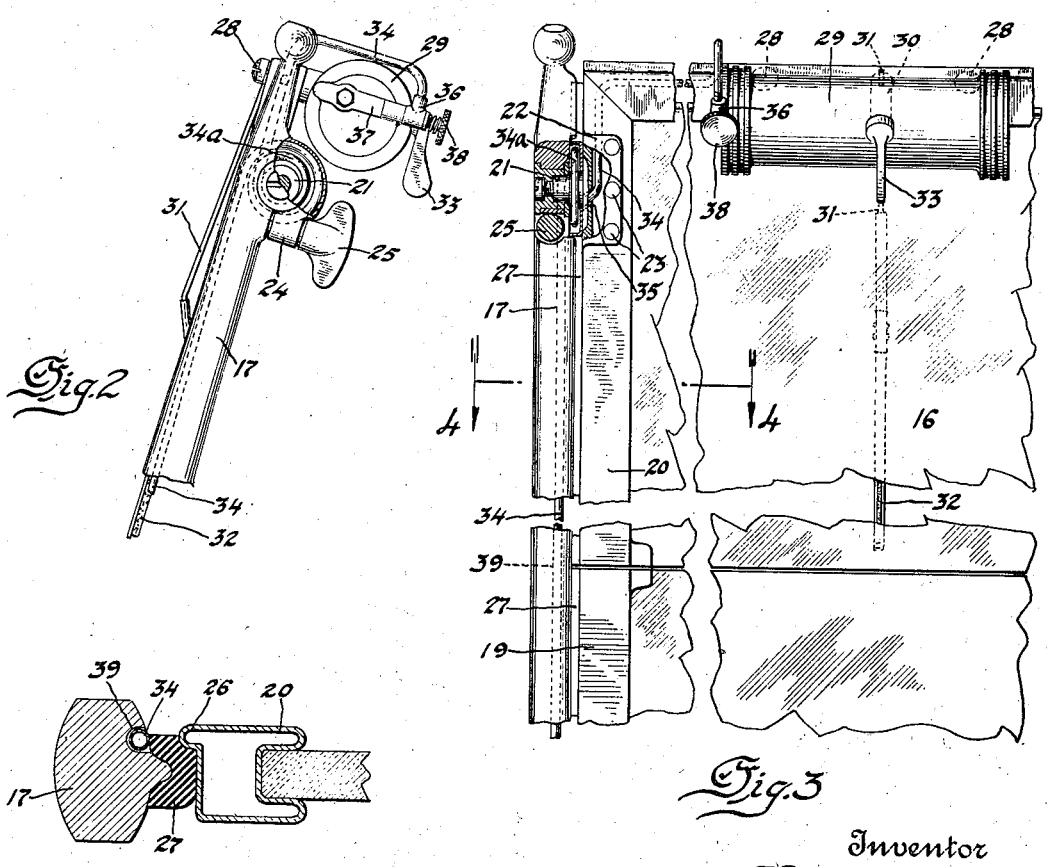
Fig.2
Fig.3
Fig.4
Inventor
Roscoe Beringer
By his Attorneys Patented Feb. 8, 1927.

1,616,648

UNITED STATES PATENT OFFICE.

ROSCOE BERINGER, OF DETROIT, MICHIGAN, ASSIGNOR TO GENERAL MOTORS CORPORATION, OF DETROIT, MICHIGAN, A CORPORATION OF DELAWARE.

WINDSHIELD-CLEANER INSTALLATION.

Application filed November 15, 1922. Serial No. 601,094.

This invention relates to window cleaning devices and more particularly to cleaning devices for wind shields for automobiles.

One of the objects of the invention is the provision of a new and improved wind shield cleaning device in which the tubular connector member is so arranged that it does not interfere in any manner with the adjusting of the shield and at the same time is concealed from view and thus does not detract from the appearance of the vehicle.

Other and further objects and advantages of the invention will appear from the description and the accompanying drawings, in which, Fig. 1 is a side view of a portion of an automobile showing my invention in position thereon;

Fig. 2 is a side elevation on an enlarged scale of a portion of a wind shield showing my invention in position thereon, with parts broken away;

Fig. 3 is a rear elevation thereof; and,

Fig. 4 is a section on line 4—4 of Fig. 3;

On the drawings, the reference character 10, designates an automobile having the usual body 11 and chassis frame 12, on which is mounted the engine 13. The engine 13 is provided with air intake manifold 14 and an exhaust manifold 15, as is usual in such constructions.

The body 11 is provided at its forward end with a wind shield 16, which may be of the usual, or of any well known construction. As shown, the shield comprises the supports 17 suitably mounted on the cowl 18 of the body 11, in the lower portion of which is mounted the lower section 19 of the shield. The upper frame section 20 of the shield is provided with laterally extending trunnions 21 adjacent its upper edge. These trunnions, are provided with the usual attaching portions 22 by means of which they are secured to the supports 17 in any suitable manner, as by the fastening means 23. The trunnions 21 are journaled in split bearings 24 carried by the support 17 and which are provided with the usual clamping bolts 25, for holding the shield 20 in its adjusted position as is common in such constructions. The frame section 20 may be provided with a laterally extending flange 26 which is adapted to engage a weather strip of rubber or of any suitable material, which is secured to the support 17 as is usual in such construction.

Secured upon the rear side of the upper section of the shield, as by means of bolts 28, is a motor 29 which is adapted to oscillate the shaft 30 which extends through the upper portion of the frame section 20, and on the outer end of which is secured an arm 31, carrying a cleaning member 32, which is adapted to engage the forward side of the glass of the upper section of the shield for cleaning the same. Rigidly secured to the shaft 30 at its rear end is a handle 33, for manually operating the shield cleaning member 32.

The motor 29 for oscillating the shaft 30 may be of any suitable or well known construction. Since the details of the motor mechanism form no part of my invention it is not thought necessary to illustrate the same.

The motor is adapted to be operated by suction from the engine in any suitable manner, such for instance, as in the manner disclosed in patent to Folberth 1,352,504, Sept. 14, 1920, in which a piston is caused to reciprocate by atmospheric pressure on first one side of the piston and then the other as the air is exhausted from the opposite side.

It is common practice in such constructions to employ a flexible tubular connector or suction member between the motor and the intake manifold of the engine. This type of connector, however, is objectionable in that no attempt is made to conceal the same, and moreover, being made of rubber it soon deteriorates and renders the motor ineffective. It has been found that metallic tubes may be employed for this purpose if they are properly arranged. Provision must be made, however, for permitting the pivotal movement of the upper section of the shield. In order to accomplish this, the connector tube or suction member which has its lower end secured in any suitable manner in the intake manifold 14, and extends along the supports 17, is given one or more turns about the trunnion 21 to form a coil 34ª concentric with the axis of the trunnion. If the coil is composed of more than one turn, it is preferably in the form of a spiral, in order that the same may be arranged concentrically about the trunnion 21 between the shield and its support. When the shield is moved outwardly the coil 34ª will loosen or tighten depending on whether it is a right hand or a left hand one. As shown, the coil is a right hand one and is wound sufficiently loose to permit the shield to be moved outwardly without unduly tightening the coil about the trunnion.

In order not to detract from the appearance of the wind shield or the car as a whole when a cleaner is employed, means are provided for concealing the suction tube. As shown, the lower end of the tube 34 is secured in any suitable manner in the manifold 14; and from the manifold the tube extends beneath the hood and cowl to the wind shield support 17. If the wind shield support is not tubular a suitable groove or recess 39 is provided which extends longitudinally thereof to a point opposite the trunnion 21. The tube 34 extends upwardly in said groove and is given one or more turns about the trunnion 21 and led through an opening 35, into the interior of the frame 20 to a point adjacent to the motor 29, from whence it extends through the frame and is attached in any suitable manner to a valve mechanism 36. The valve mechanism is in communication with the manifold 37, of the motor 29. A manually operated valve 38, is adapted to control the operation of the motor 29.

In the operation of the device, when the valve 38 is opened, the suction in the manifold 37, which by means of the operation of suitable valves, will cause the pressure of the air to oscillate the member 32 for cleaning the front face of the shield, regardless of the angular position of the upper section of the shield.

It is thought from the foregoing taken in connection with the accompanying drawings that the construction and operation of my device will be apparent to those skilled in the art, and it is to be understood that such changes in size, shape, proportion and details of construction may be made as do not depart from the spirit and scope of the appended claims.

What I claim is:

1. In a device of the class described, supports, a shield, pivotal means for connecting said shield to said supports, a cleaner mounted on said shield, a tubular member connected to said cleaner, and wound about one of said pivotal means in the form of a resilient open spiral to permit the swinging movements of the shield, the lower end of said tubular member being adapted to be connected to a source of suction.

2. In a device of the class described, a support, a wind shield section, pivotal means for connecting said support to said section, a motor for a wind shield cleaner mounted on said section and a metallic tubular member adapted to be connected to an engine and extending upwardly along and within the periphery of said support, about said pivot and within said section to said motor, whereby the shield may be angularly adjusted without interfering with said tubular member.

3. In a device of the class described, a support, a wind shield frame, pivotal means for connecting said wind shield frame to said support, said support being provided with a groove extending longitudinally thereof from its lower end to said pivotal means, a wind shield cleaner motor mounted on said frame, and a metallic tube extending within said groove, coiled about said pivotal means and extending from the same within said frame to said motor.

In testimony whereof I affix my signature.

ROSCOE BERINGER.